(No Model.)
W. J. CLIFFORD.
WALL PAPER TRIMMER.
No. 566,661. Patented Aug. 25, 1896.
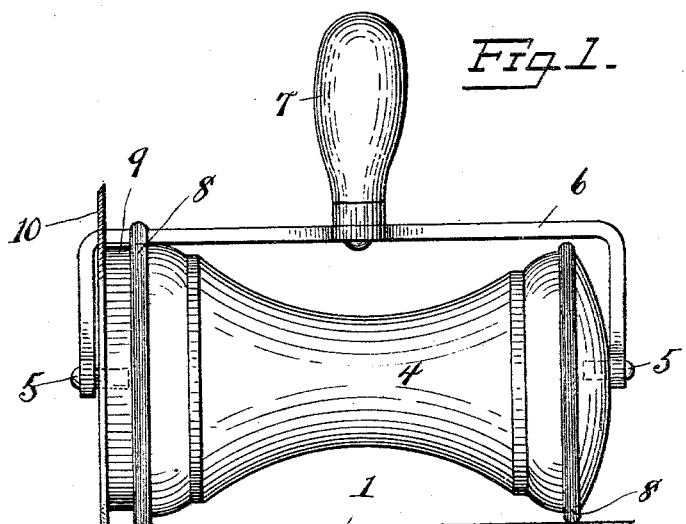
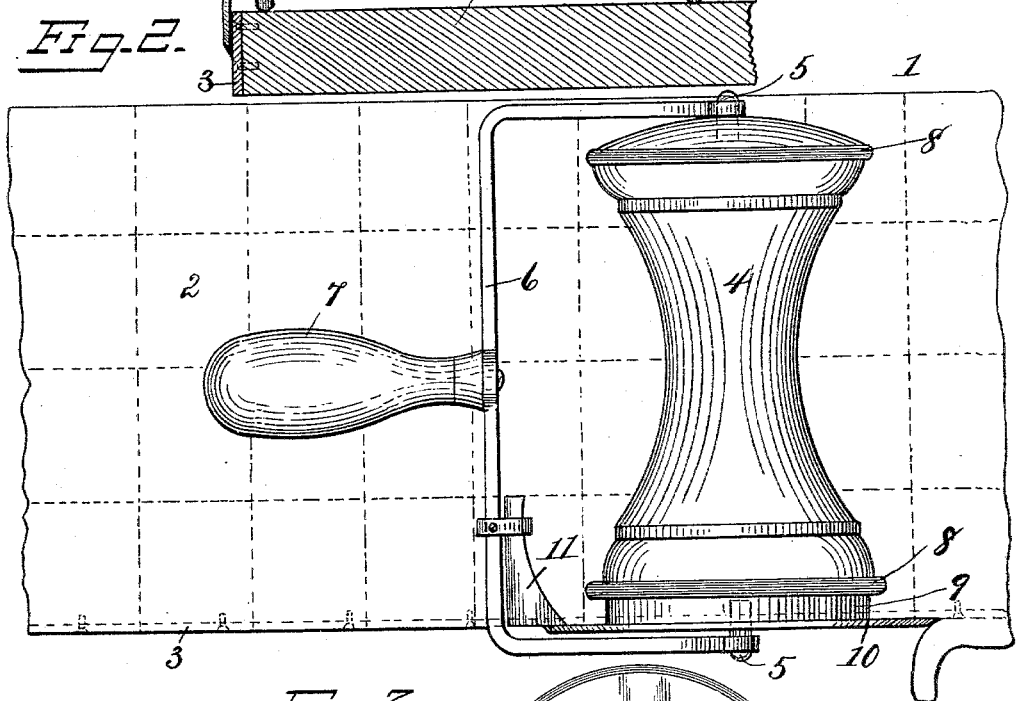
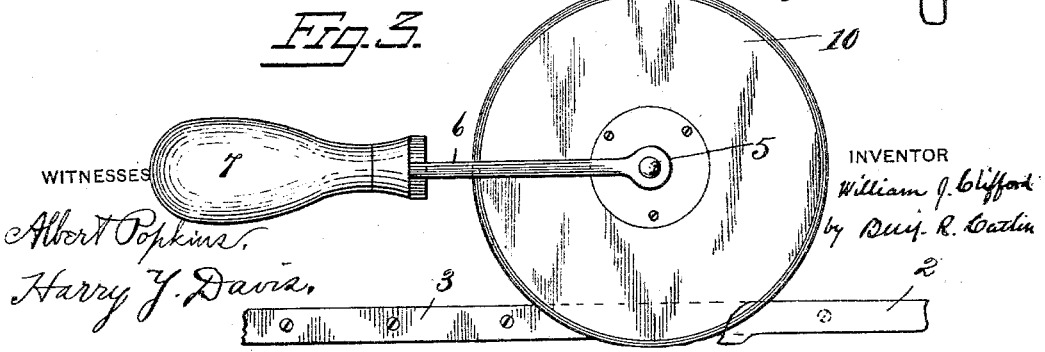
WITNESSES
Albert Popkins.
Harry J. Davis.
INVENTOR
William J. Clifford
by Benj. R. Catlin

UNITED STATES PATENT OFFICE.

WILLIAM J. CLIFFORD, OF PITTSBURG, PENNSYLVANIA.

WALL-PAPER TRIMMER.

SPECIFICATION forming part of Letters Patent No. 566,661, dated August 25, 1896.

Application filed January 31, 1896. Serial No. 577,572. (No model.)

*To all whom it may concern:*

Be it known that I, WILLIAM J. CLIFFORD, a resident of Pittsburg, in the county of Allegheny and State of Pennsylvania, have invented certain new and useful Improvements in Wall-Paper Trimmers; and I do hereby declare the following to be a full, clear, and exact description of the invention, such as will enable others skilled in the art to which it pertains to make and use the same.

The invention relates to devices for trimming wall-paper and particularly after the application of paste thereto preparatory to hanging.

The object of the invention is to provide a simple and efficient trimmer that will not disturb the paste nor crease or mark the paper and that can be operated in a speedy and cleanly manner.

It consists in the construction hereinafter described and particularly pointed out.

In the accompanying drawings, Figure 1 is a front elevation of the device. Fig. 2 is a plan, and Fig. 3 an end elevation.

Numeral 1 indicates a portion of a papering-board or table-top. 2 indicates wall-paper, and 3 a thin steel plate secured to the edge of the board, the cutting edge of said plate being situated in the plane of the upper surface of the board.

4 denotes a block or roller having approximately the form of an hour-glass and provided with gudgeons 5, by means of which it is rotatably supported in a frame 6, having a handle 7. The roller is made in substantially the form illustrated to obviate, as far as practicable, contact of its surface with that of the pasted paper.

Rollers operating upon freshly-pasted surfaces are liable to push the paste and cause undue accumulation thereof, or they may push the paste entirely off the paper. Furthermore, they pick up paste by adhesion, and it gradually accumulates and hardens upon them in manner to seriously interfere with their operation.

By the present improvement the lines of contact of the roller with the paste are reduced to two circular ribs, preferably provided with rubber tires or rings 8. The intermediate parts of the roller, and also the parts exterior to the two ribs or circles, are made of much smaller diameter, so as to be supported entirely above the surface upon which said ribs or rings 8 rest and roll. The rings 8 are made of rubber or like material and constitute the sole lines of contact with the upper surface of the board or of the pasted paper placed thereon. At 9, adjacent the end of the roller, it is made decidedly smaller, as indicated, to certainly avoid all possible contact with the pasted paper, whereby the paste might be forced off the paper and its edge unduly dried.

10 denotes a cutting-disk fixed to the roller contiguous the groove 9 and adapted to cooperate with the cutting strip or plate 3. It has a diameter greater than that of the roller, so that when suitably placed and operated its lower part overlaps the plate 3, substantially as shown.

The rib next to the disk 10, whether or not it is provided with a ring or tire of rubber or the like, is made slightly larger than that near the opposite end of the roller, so that the end of the roller carrying the trimming-disk will tend to move faster than the other, thereby causing it to hug the steel plate and cut closely and accurately.

11 denotes a scraper fixed to the frame and adapted to remove paste from the inner surface of the disk. The disk will unavoidably pick up some paste, though the crowding of the same toward the edge of the sheet by the end of the roller is obviated by the groove 9, as explained.

The hour-glass form of the roller provided with the two narrow circular bearings or ribs obviates adhesion of paste thereto, and what is more important the construction prevents the pushing and accumulation of paste in front of the roller, as would occur if any considerable part of the surface rolled on the paper.

The use of rubber tires is preferred, because, being elastic, they obviate marking or creasing the softened paper. They also cause the device to run more smoothly and are not so liable to pick up paste.

It is contemplated making the roller of aluminium, though any suitable material may be selected.

The following dimensions are very suitable, though others can be used: length of roller, four inches; diameter of the cutting-disk, three inches; width of steel plate and overlap of blade, three-eighths of an inch; diameter of the larger rib, two and one-fourth inches; diameter of the smaller rib, two inches.

As the tire or ring adjacent the cutting-disk has the greatest diameter, its end of the roller will tend to move a little faster than the other, which operates to keep the cutting-blades in close contact. The elasticity of the tire tends to obviate the dragging of the outer end of the roller and holds the removable disk-blade against the fixed blade in a yielding manner.

In practice I contemplate, in most cases, the folding of the pasted paper in such manner that the roller does not come in contact with the pasted surface. In such case, though, smearing the roller and pushing of the paste is not to be feared. The hour-glass form obviates packing the pasted folds together midway between its edges, and the particular construction elsewhere pointed out insures other advantages named.

Having described my invention, what I claim is—

1. The device for trimming paper consisting of a roller having approximately the form of an hour-glass, said roller being provided with two bearing-ribs, a circular blade and a handle, substantially as described.

2. The device for trimming paper consisting of a roller having approximately the form of an hour-glass, said roller being provided with two bearing-ribs, a circular blade and a handle, said ribs having elastic tire, substantially as described.

3. The device for trimming paper consisting of a roller having approximately the form of an hour-glass, said roller being provided with two bearing-ribs, a circular blade and a handle, the rib next the blade being larger than the other, substantially as described.

4. The device for trimming paper consisting of a roller having approximately the form of an hour-glass, said roller being provided with two bearing-ribs, a circular blade and a handle, said roller being reduced in diameter between the blade and the proximate rim to leave a groove 9 to obviate drying the edge of the paper, substantially as described.

In testimony whereof I have signed this specification in the presence of two subscribing witnesses.

WILLIAM J. CLIFFORD.

Witnesses:
WM. R. GLASS,
SAMUEL LANE.